US012795795B2

(12) United States Patent
Lin et al.

(10) Patent No.: US 12,795,795 B2
(45) Date of Patent: Nov. 10, 2026

(54) VOLTAGE REGULATING DEVICE FOR ORGANIC LIGHT EMITTING DIODE

(71) Applicant: Novatek Microelectronics Corp., Hsinchu (TW)

(72) Inventors: Tzu-Wei Lin, Hsinchu County (TW); Jen-Wei Li, Hsinchu County (TW); Ming-Shian Lee, Taoyuan City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 19/015,697

(22) Filed: Jan. 10, 2025

(65) Prior Publication Data

US 2026/0068010 A1 Mar. 5, 2026

(30) Foreign Application Priority Data

Aug. 28, 2024 (TW) ................................ 113132318

(51) Int. Cl.
*H05B 45/3725* (2020.01)

(52) U.S. Cl.
CPC ................................ *H05B 45/3725* (2020.01)

(58) Field of Classification Search
CPC .................................................. H05B 45/3725
See application file for complete search history.

(56) References Cited

U.S. PATENT DOCUMENTS

| | | | |
|---|---|---|---|
| 11,847,988 B2 | 12/2023 | Lu et al. | |
| 12,112,717 B2 | 10/2024 | Lu et al. | |
| 2016/0285369 A1 | 9/2016 | Koyama et al. | |
| 2021/0118379 A1 | 4/2021 | Lu et al. | |
| 2024/0038188 A1 | 2/2024 | Lu et al. | |

FOREIGN PATENT DOCUMENTS

| | | |
|---|---|---|
| TW | 201638924 | 11/2016 |
| TW | 201638924 A * | 11/2016 |
| TW | 202107164 | 2/2021 |

OTHER PUBLICATIONS

"Office Action of Taiwan Counterpart Application", issued on May 13, 2025, p. 1-p. 12.

* cited by examiner

*Primary Examiner* — Henry Luong
(74) *Attorney, Agent, or Firm* — JCIPRNET

(57) ABSTRACT

Voltage regulating devices for organic light emitting diodes (OLED) are provided. The voltage regulating device includes an operational amplifier and a voltage output circuit. The operational amplifier generates an output voltage. The voltage output circuit is coupled to the operational amplifier. The voltage output circuit is controlled by a selection signal to generate a control voltage selectively using a first operating voltage interval or a second operating voltage interval. A voltage value of the control voltage is related to a reference voltage of the OLED, and the selection signal is correspondingly generated according to the reference voltage of the OLED.

12 Claims, 10 Drawing Sheets

VOLTAGE REGULATING DEVICE FOR ORGANIC LIGHT EMITTING DIODE

CROSS-REFERENCE TO RELATED APPLICATION

This application claims the priority benefit of Taiwan application serial no. 113132318, filed on Aug. 28, 2024. The entirety of the above-mentioned patent application is hereby incorporated by reference herein and made a part of this specification.

BACKGROUND

Technical Field

The disclosure relates to driving technology of an organic light emitting diode (OLED), and in particular to a voltage regulating device for an organic light emitting diode.

Description of Related Art

The main power consumption item of current consumer electronic products is the power consumption of display screens. Therefore, how to make the display screen more power saving is one of the current research directions. Organic light emitting diode (OLED) technology is self-luminous and saves the power consumption of light emitting backplanes, so the OLED technology is often used in the display screens of consumer electronic products.

The overall brightness of an OLED display screen may be adjusted through adjusting a reference voltage coupled to one terminal of all OLED light emitting units. For example, the reference voltage is pulled down to the required negative voltage to increase the overall brightness of all the OLED light emitting units. A control voltage for preventing the OLED light emitting units from emitting light needs to maintain a fixed voltage difference with the reference voltage. Therefore, the control voltage also operates in the negative voltage interval. However, when the reference voltage and the control voltage both operate in a higher negative voltage interval, a regulator circuit providing the control voltage correspondingly increases the power consumption due to the increase in the voltage interval.

SUMMARY

The disclosure provides a voltage regulating device for an organic light emitting diode, which can reduce power consumption of the voltage regulating device and still operate normally in a higher negative voltage operating interval.

A voltage regulating device for an organic light emitting diode according to an embodiment of the disclosure includes an operational amplifier and a voltage output circuit. The operational amplifier generates an output voltage. The voltage output circuit is coupled to the operational amplifier. The voltage output circuit is controlled by a selection signal to generate a control voltage selectively using a first operating voltage interval or a second operating voltage interval. A voltage value of the control voltage is related to a reference voltage of the organic light emitting diode, and the selection signal is correspondingly generated according to the reference voltage of the organic light emitting diode.

A voltage regulating device for an organic light emitting diode according to an embodiment of the disclosure includes a first regulator, a second regulator, and a selector. The first regulator generates a first control voltage according to a first operating voltage interval. The second regulator generates a second control voltage according to a second operating voltage interval. The selector selectively uses the first control voltage or the second control voltage as a control voltage according to a selection signal. A voltage value of the control voltage is related to a reference voltage of the organic light emitting diode, and the selection signal is correspondingly generated according to the reference voltage of the organic light emitting diode.

Based on the above, the voltage regulating device for the organic light emitting diode according to the embodiments of the disclosure dynamically switches the operating voltage interval in the voltage regulating device through the design of the circuit structure, so that the voltage regulating device may correspondingly generate the control voltage for preventing the organic light emitting diode from emitting light selectively based on the reference voltage of the organic light emitting diode, which can reduce the power consumption of the voltage regulating device, and can still provide the corresponding operating voltage normally when the reference voltage of the organic light emitting diode is in a higher negative voltage operating interval.

DESCRIPTION OF THE EMBODIMENTS

Figure 1:
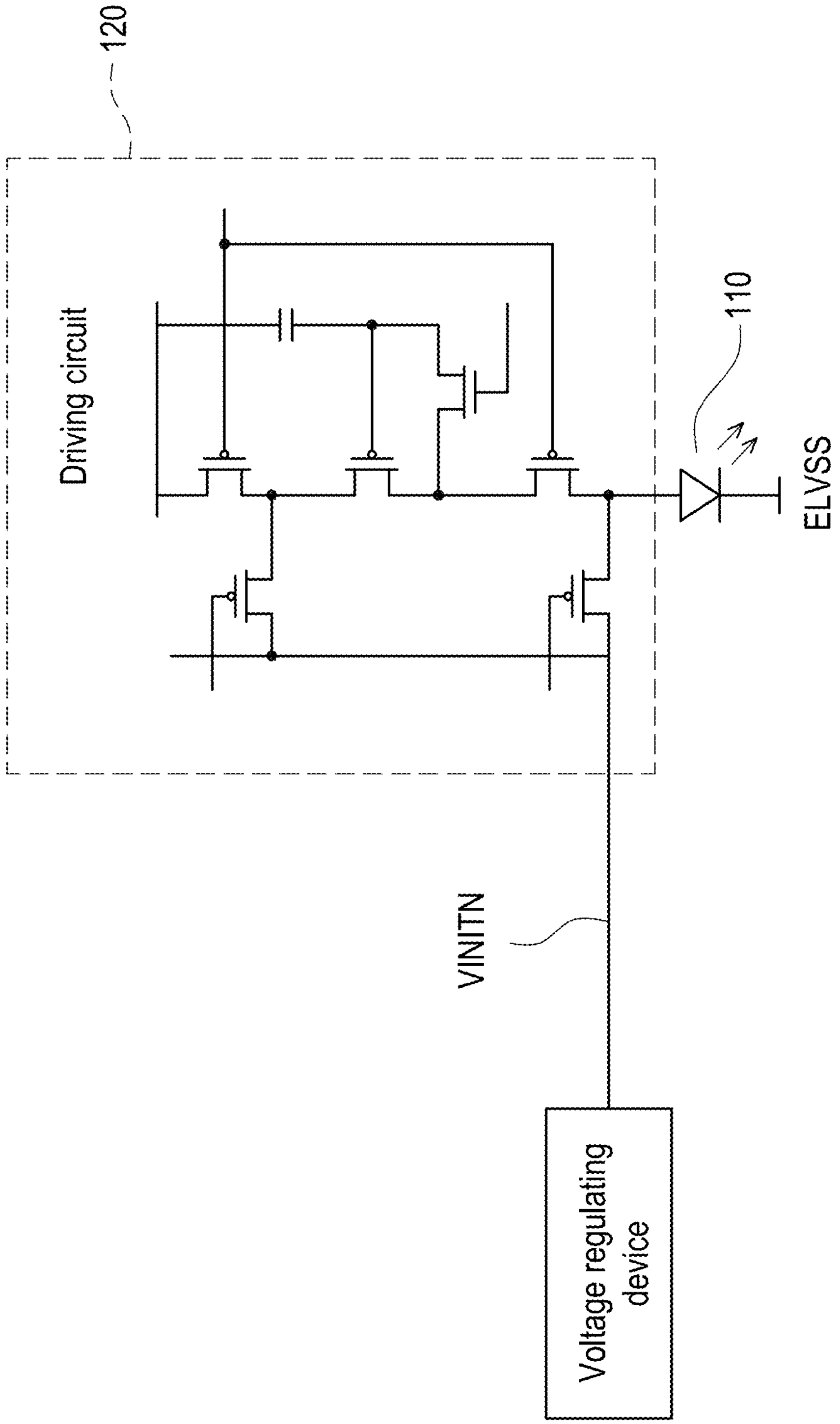
FIG. 1 is a schematic diagram of an organic light emitting diode (OLED) light emitting unit, a driving circuit, and a voltage regulating device on a display device according to an embodiment of the disclosure.

FIG. 1 is a schematic diagram of an organic light emitting diode (OLED) light emitting unit 110, a driving circuit 120, and a voltage regulating device 130 on a display device according to an embodiment of the disclosure. The display device may be a display panel applied to a consumer electronic device such as a home television, a mobile phone, a smart watch, a tablet computer, and a notebook computer.

The driving circuit 120 is used to drive the OLED light emitting unit 110. The embodiment uses a 6T1C structure in FIG. 1 as an example of the driving circuit 120. The driving circuit 120 may have a structure of 6 transistors combined with 1 capacitor (referred to as the 6T1C structure) or a structure of 8 transistors combined with 1 capacitor (referred to as an 8T1C structure). Persons applying the embodiment are not limited to using the circuit structure in the driving circuit 120.

The brightness of the display device may be adjusted through adjusting a value of a reference voltage (for example, a reference voltage ELVSS in FIG. 1) coupled to one terminal of all the OLED light emitting units 110. The reference voltage ELVSS of the embodiment may be an emission light reference voltage signal VSS. For example, the reference voltage ELVSS may be adjusted down to a negative voltage (here, "medium negative voltage" is used as the substitutive term for "negative voltage") or even a higher negative voltage (here, "high negative voltage" is used as the substitutive term for "higher negative voltage") to brighten all the OLED light emitting units 110.

Figure 2:
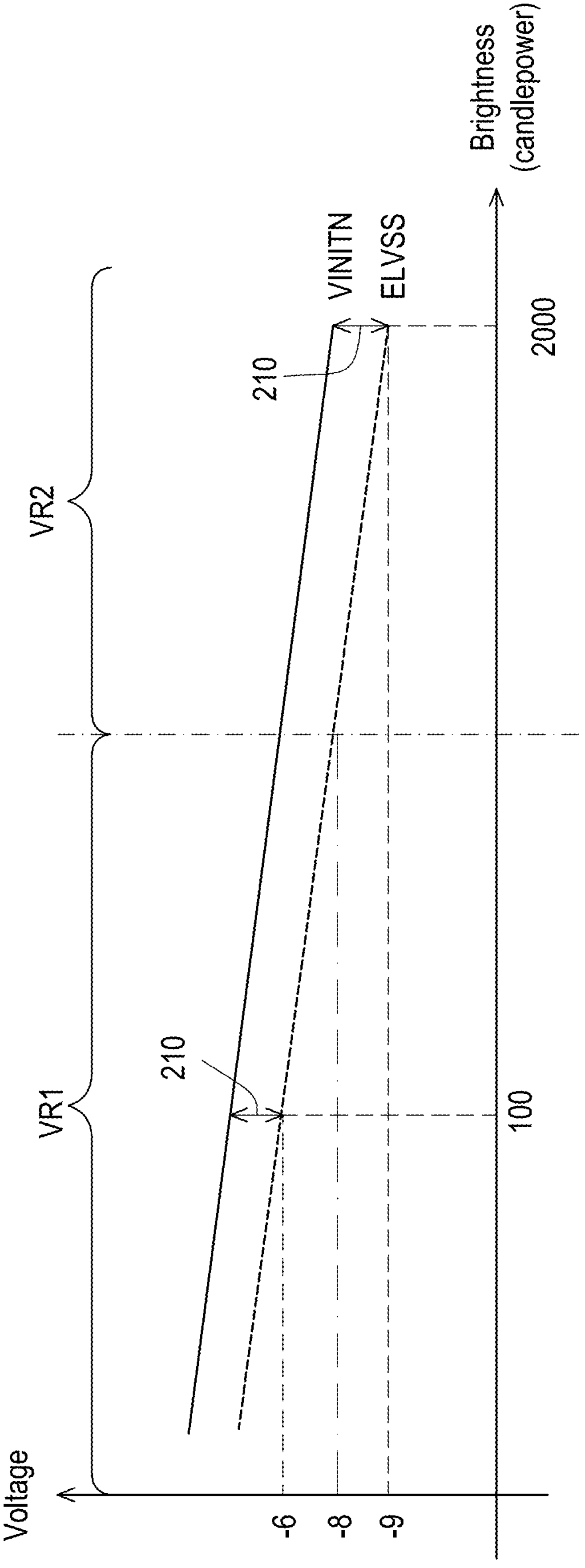
FIG. 2 is a voltage schematic diagram of a reference voltage ELVSS and a control voltage VINITN for preventing the OLED light emitting unit from emitting light in FIG. 1.

On the other hand, the driving circuit 120 uses a control voltage VINITN to prevent the OLED light emitting unit 110 from emitting light. FIG. 2 is a voltage schematic diagram of the reference voltage ELVSS and the control voltage VINITN for preventing the OLED light emitting unit 110 from emitting light in FIG. 1. Referring to FIG. 2, when the reference voltage ELVSS is −6 volts (V), the OLED light emitting unit 110 emits a brightness of approximately 100 candlepower. When the reference voltage ELVSS is-9V, the OLED light emitting unit 110 emits a brightness of approximately 2000 candlepower. As the control voltage VINITN for preventing the OLED light emitting unit 110 from emitting light, it is necessary to maintain a fixed voltage difference (as shown by an arrow 210 in FIG. 2) with the reference voltage ELVSS, so that the OLED light emitting unit 110 does not emit light when two terminals of the OLED light emitting unit 110 are respectively coupled to the reference voltage ELVSS and the control voltage VINITN. The values in FIG. 2 are for convenience of illustration only, and persons applying the embodiment may adjust any value in FIG. 2 according to requirements. For example, although the voltage value of the control voltage VINITN in FIG. 2 is greater than the voltage value of the reference voltage ELVSS, in other embodiments, the voltage value of the control voltage VINITN may also be less than or equal to the voltage value of the reference voltage ELVSS.

On the other hand, based on the level of voltage tolerance, the process components can be classified into those corresponding to the low negative voltage range (e.g., 0V to −1.2V), the medium negative voltage range (0V to −8V), and the high negative voltage range (0V to −20V). A voltage interval VR1 of FIG. 2 is in the medium negative voltage interval, and a voltage interval VR2 is in the high negative voltage interval. In order for the control voltage VINITN to output a voltage value in the high negative voltage interval, the voltage regulating device 130 in FIG. 1 needs to be implemented by a process component that may withstand the high negative voltage interval, but the cost of the process component that may withstand the high negative voltage interval is higher, thereby increasing cost. On the other hand, most scenes where the display device in FIG. 1 is used are not often in a strong light environment, so only at this time does the display device require a higher brightness, such as 2000 candlepower. When located in an indoor environment, the display device may often be used in a low brightness state (for example, 100 to 200 candlepower), that is, the reference voltage ELVSS is usually applied in the medium negative voltage interval.

Since the voltage regulating device 130 providing the control voltage VINITN needs to support the voltage value of the high negative voltage interval, the voltage regulating device 130 needs to be able to operate normally in the high negative voltage interval, and the voltage regulating device 130 also needs to operate normally in the high negative voltage interval. In the above situation, when charging/discharging the display panel in the display device, based on the power formula (power is the product of current and voltage), the power consumption of the voltage regulating device 130 operating in the high negative voltage interval is much greater than the power consumption of the voltage regulating device 130 operating in the medium negative voltage interval.

In order for the voltage regulating device 130 according to the embodiment of the disclosure to reduce the power consumption and still operate normally in a higher negative voltage operating interval (that is, the high negative voltage interval), the voltage regulating device 130 can dynamically adjusts its own operating voltage interval in coordination with the voltage value of the control voltage VINITN to be output. For example, when the control voltage VINITN in the medium negative voltage interval is to be output, the operating voltage interval of the voltage regulating device 130 is correspondingly switched to the medium negative voltage interval, thereby reducing power consumption. When the control voltage VINITN in the high negative voltage interval is to be output, the operating voltage interval of the voltage regulating device 130 is correspondingly switched to the high negative voltage interval, thereby still operating normally and providing the required control voltage VINITN in a higher negative voltage operating interval. Each embodiment compliant with the spirit of the disclosure is provided below for detailed description.

Figure 3:
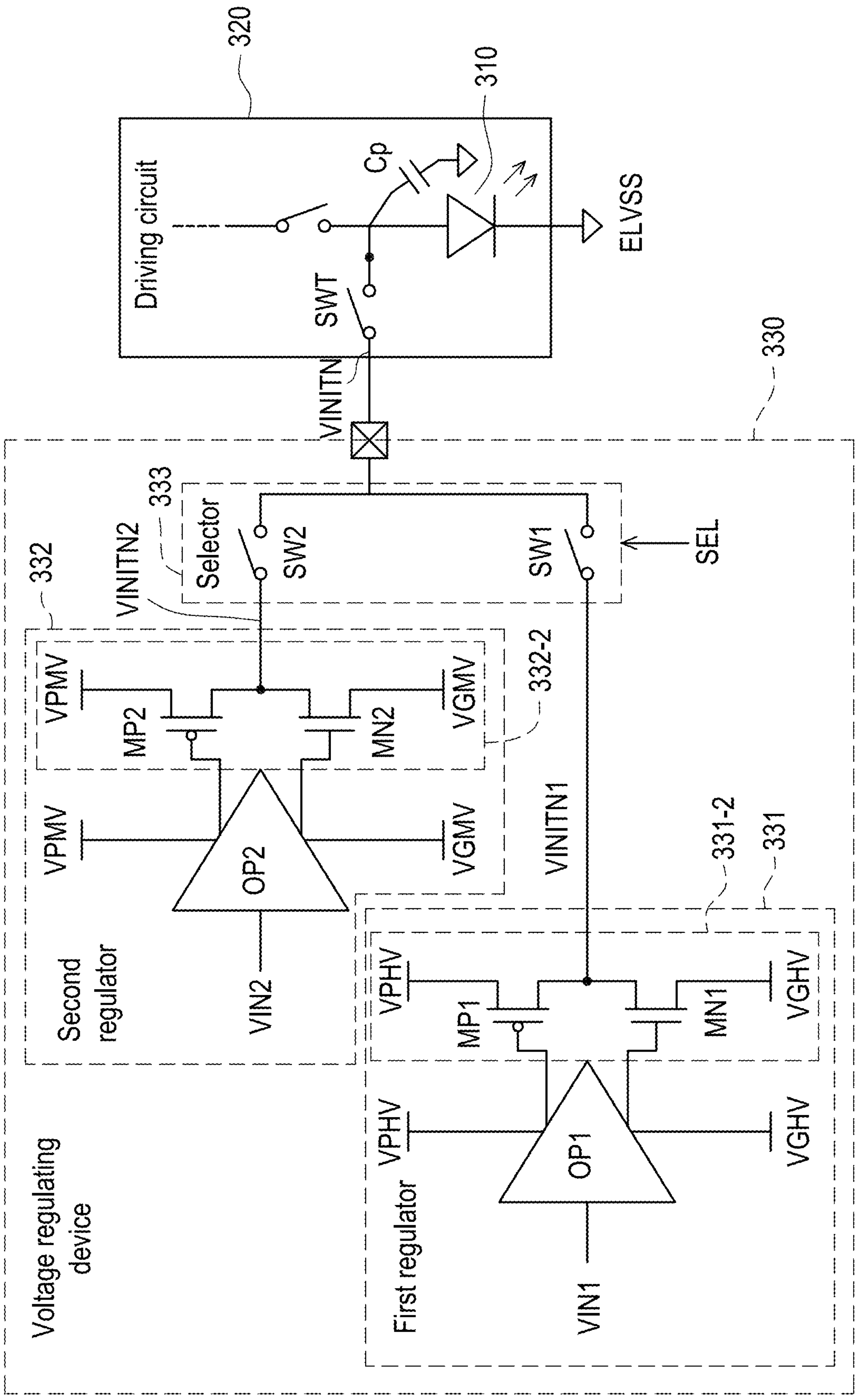
FIG. 3 is a schematic diagram of an OLED display unit, a driving circuit, and a voltage regulating device according to a first embodiment of the disclosure.

FIG. 3 is a schematic diagram of an OLED display unit 310, a driving circuit 320, and a voltage regulating device 330 according to a first embodiment of the disclosure. The structure of the driving circuit 320 in FIG. 3 is simplified. One terminal of the OLED display unit 310 receives the reference voltage ELVSS. The other terminal connected to the OLED display unit 310 having a parasitic capacitance Cp and a switch SWT for receiving the control voltage VINITN are mainly shown for the driving circuit 320. When charging/discharging the display device, the parasitic capacitance Cp at the other terminal of the OLED display unit 310 is usually charged/discharged, thereby affecting the overall power consumption of the display device.

The voltage regulating device 330 includes a first regulator 331, a second regulator 332, and a selector 333. The first regulator 331 generates a first control voltage VINITN1 according to a first operating voltage interval. Specifically, the first regulator 331 includes a first operational amplifier OP1 and an output stage circuit 331-2. The first operational amplifier OP1 generates a first output voltage at two output terminals thereof according to an input voltage VIN1. The output stage circuit 331-2 is coupled to the first operational amplifier OP1. The output stage circuit 331-2 includes transistors MN1 and MP1. The output stage circuit 331-2 generates the first control voltage VINITN1 according to the first output voltage generated by the first operational amplifier OP1, a first supply voltage VPHV, and a first ground voltage VGHV. The first supply voltage VPHV and the first ground voltage VGHV are related to the first operating voltage interval. The first operating voltage interval of the embodiment may be the high negative voltage interval, and the first operational amplifier OP1 in the first regulator 331 and the transistors MN1 and MP1 in the output stage circuit 331-2 all adopt process components that may withstand the high negative voltage interval. The first supply voltage VPHV may be 0 V, and the first ground voltage VGHV may be −20 V. The first operational amplifier OP1 operates between the first supply voltage VPHV and the first ground voltage VGHV.

The second regulator 332 generates a second control voltage VINITN2 according to a second operating voltage interval. Specifically, the second regulator 332 includes a second operational amplifier OP2 and an output stage circuit 332-2. The second operational amplifier OP2 generates a second output voltage at two output terminals thereof according to an input voltage VIN2. The output stage circuit 332-2 is coupled to the second operational amplifier OP2. The output stage circuit 332-2 generates the second control voltage VINITN2 according to the second output voltage generated by the second operational amplifier OP2, a second supply voltage VPMV, and a second ground voltage VGMV. The second supply voltage VPMV and the second ground voltage VGMV are related to the second operating voltage interval. The second operating voltage interval of the embodiment may be the medium negative voltage interval, and the second operational amplifier OP2 in the first regulator 332 and transistors MN2 and MP2 in the output stage circuit 332-2 may adopt process components that may withstand the medium negative voltage interval, and it is not necessary to adopt process components that may withstand the high negative voltage interval. The second supply voltage VPMV may be 0 V, and the second ground voltage VGMV may be −8 V. The second operational amplifier OP2 operates between the second supply voltage VPMV and the second ground voltage VGMV.

The selector 333 selectively uses one of the first control voltage VINITN1 and the second control voltage VINITN2 as a control voltage VINITN according to a selection signal SEL. The voltage value of the control voltage VINITN is related to the reference voltage ELVSS coupled to the OLED display unit 310, and the selection signal SEL may be correspondingly generated according to the reference voltage ELVSS of the OLED display unit 310. The selector 333 may include switches SW1 and SW2, and one of the switches SW1 and SW2 is selectively conducted according to the selection signal SEL. Since the selector 333 needs to support the high negative voltage interval, the switches SW1 and SW2 need to adopt process components that may withstand the high negative voltage interval.

The voltage regulating device 330 of the embodiment may simultaneously enable the first regulator 331 and the second regulator 332, and one of the first control voltage VINITN1 and the second control voltage VINITN2 is selected as the control voltage VINITN through the selector 333. In the situation where the regulators 331 and 332 are simultaneously enabled, although the regulators 331 and 332 both consume power, since the static power consumption of the regulators 331 and 332 (the order of magnitude of power consumption is approximately 10 to the power of −6) is much greater than the dynamic power consumption of elements of the voltage regulating device 330 all operating in the high negative voltage interval (the order of magnitude of power consumption is approximately 10 to the power of −3), so simultaneously enabling the regulators 331 and 332 can still save some power consumption.

The voltage regulating device 330 of the embodiment may also selectively enable one of the regulators 331 and 332 according to the operating voltage interval where the control voltage VINITN is in, and turn off the other one of the regulators 331 and 332 that does not need to be used, thereby saving more power consumption. In the embodiment, the voltage value of the control voltage VINITN is determined based on the reference voltage ELVSS and the voltage difference 210 in FIG. 2. Therefore, the voltage regulating device 330 or other circuits may correspondingly adjust the voltage value of the control voltage VINITN generated by the voltage regulating device 330 through the adjustment of the reference voltage ELVSS, thereby correspondingly generating the selection signal SEL, and selectively enabling or turning off the regulators 331 and 332.

Figure 4:
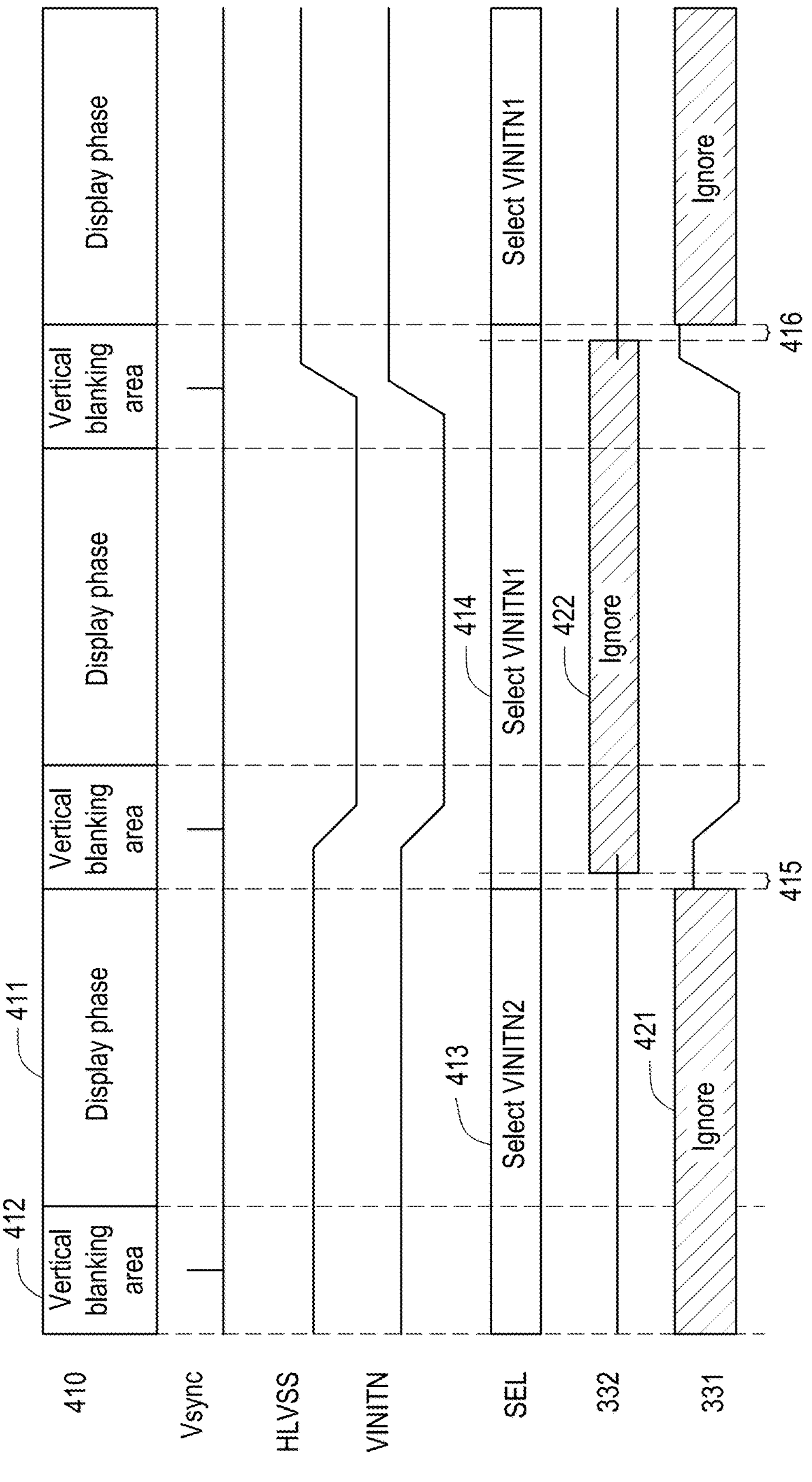
FIG. 4 is a schematic diagram of a waveform of each signal in the voltage regulating device according to the first embodiment of the disclosure.

FIG. 4 is a schematic diagram of a waveform of each signal in the voltage regulating device 330 according to the first embodiment of the disclosure. A reference numeral 410 in FIG. 4 represents the driving timing of the display device, which respectively involves a display phase (taking a display phase 411 as an example) for displaying an image and a vertical blanking area (taking a vertical blanking area 412 as an example) for switching the displayed image. A signal Vsync of the embodiment is a vertical synchronization signal of the display device and has a pulse in the vertical blanking area 412. Referring to FIG. 3 and FIG. 4 at the same time, one of the first control voltage VINITN1 and the second control voltage VINITN2 is selectively used as the control voltage VINITN according to the required operating voltage interval. For example, during a period 413, the voltage regulating device 330 selects the second control voltage VINITN2 as the control voltage VINITN according to the selection signal SEL; and during a period 414, the voltage regulating device 330 selects the first control voltage VINITN1 as the control voltage VINITN according to the selection signal SEL.

In order to extenuate surges that may be generated during a period of switching the first regulator 331 and the second regulator 332, the first regulator 331 and the second regulator 332 may be simultaneously enabled during the entire period, and during switching (for example, switching periods 415 and 416), the voltages of the first control voltage VINITN1 and the second control voltage VINITN2 generated by the first regulator 331 and the second regulator 332 need to be the same. In another embodiment compliant with the disclosure, the first regulator 331 and the second regulator 332 may also be non-overlappingly switched during the switching periods 415 and 416 to prevent short-circuit current from being generated inside the circuit. In other words, in an embodiment, the first regulator 331 and the second regulator 332 may both be turned off during the switching periods 415 and 416, the first regulator 331 is enabled after the period 415, and the second regulator 332 is enabled after the period 416. In the above situation, the voltage value of the control voltage VINITN is maintained by relying on the parasitic capacitance (for example, the parasitic capacitance Cp of FIG. 3) in the display device.

During ignore periods when the regulators 331 and 332 are not selected according to the selection signal SEL (for example, a ignore period 421 is a period when the first regulator 331 is not selected; and a ignore period 422 is a period when the second regulator 332 is not selected), the first regulator 331 during the period 421 or the second regulator 332 during the period 422 may be selectively turned off to save power or remain turned on to save startup time.

When switching the first regulator 331 and the second regulator 332 to provide the corresponding voltage, it should be noted that the operating voltage intervals provided by the regulators 331 and 332 are not the same, and the first operating voltage interval (the high negative voltage interval) corresponding to the first regulator 331 may include the second operating voltage interval (the medium negative voltage interval) corresponding to the second regulator 332. Therefore, the first regulator 331 needs to be used to boost or lower the control voltage VINITN in the first operating voltage interval (the high negative voltage interval) exceeding the second operating voltage interval (the medium negative voltage interval). When the control voltage VINITN is boosted or lowered to be in the second operating voltage interval (the medium negative voltage interval), the first regulator 331 is then switched to the second regulator 332.

For example, when the control voltage VINITN is to be switched from the medium negative voltage interval to the high negative voltage interval, the selector 333 is used to switch from the second control voltage VINITN2 provided by the second regulator 332 to the first control voltage VINITN1 provided by the first regulator 331. At this time, the first control voltage VINITN1 and the second control voltage VINITN2 are both in a second voltage interval (the medium negative voltage interval). Then, the first regulator 331 is used to reduce the voltage level of the first control voltage VINITN1 as the control voltage VINITN to a first voltage interval (the high negative voltage interval), thereby completing the switching from the regulator 332 to the regulator 331. Correspondingly, when the control voltage VINITN is to be switched from the high negative voltage interval to the medium negative voltage interval, since the second regulator 332 cannot provide the voltage level in the high negative voltage interval, the voltage level of the first control voltage VINITN1 provided by the first regulator 331 needs to be first reduced to the second voltage interval (the medium negative voltage interval). Then, the selector 333 is used to switch the first control voltage VINITN1 provided by the first regulator 331 to the second control voltage VINITN2 provided by the second regulator 332, thereby completing the switching from the regulator 331 to the regulator 332.

Figure 5:
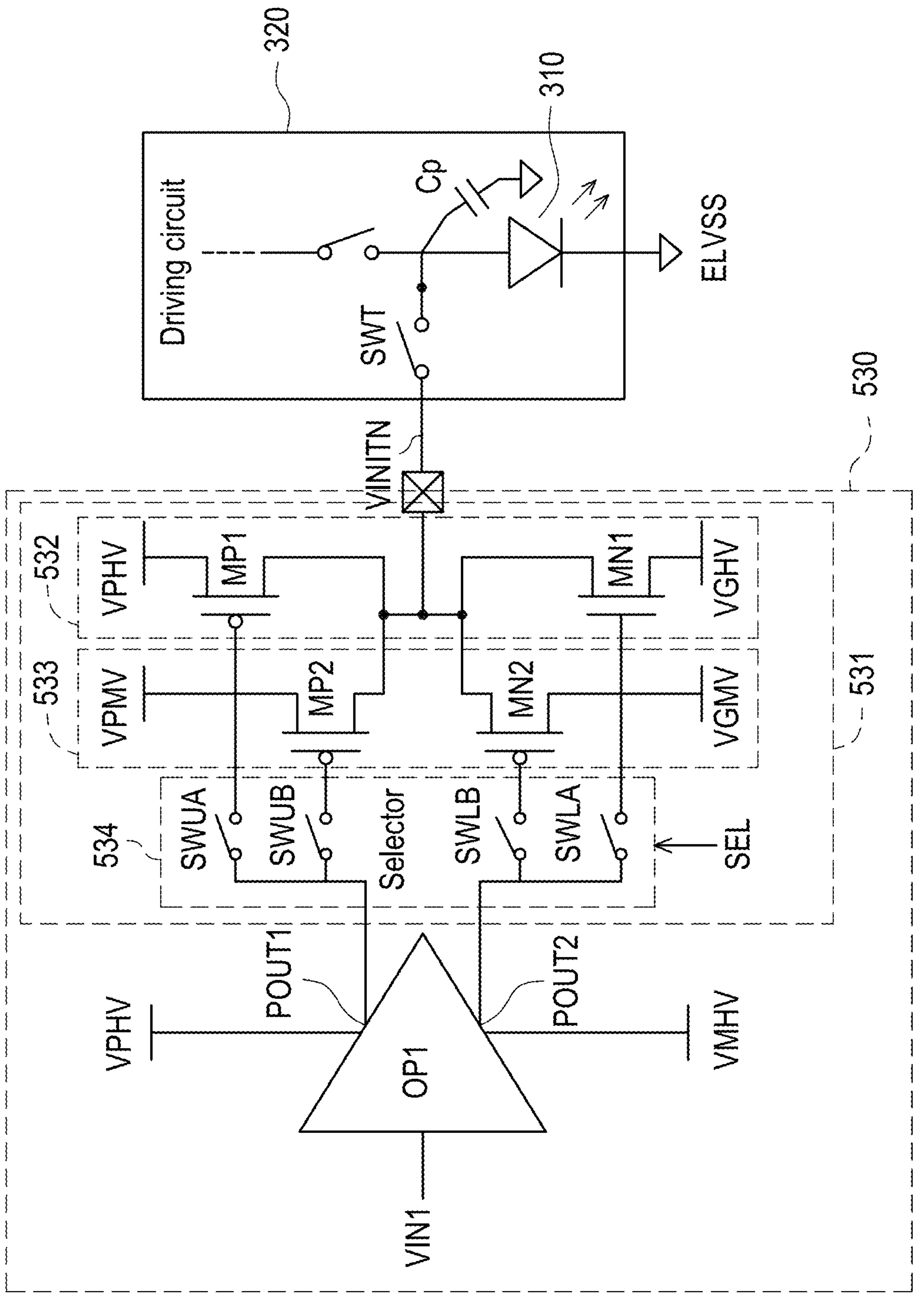
FIG. 5 is a schematic diagram of an OLED display unit, a driving circuit, and a voltage regulating device according to a second embodiment of the disclosure.

FIG. 5 is a schematic diagram of the OLED display unit 310, the driving circuit 320, and a voltage regulating device 530 according to a second embodiment of the disclosure. The OLED display unit 310 and the driving circuit 320 in FIG. 5 are described as the corresponding elements in FIG. 3. The voltage regulating device 530 includes an operational amplifier OP and a voltage output circuit 531. The operational amplifier OP generates an output voltage according to the input voltage VIN1. The voltage output circuit 531 is coupled to the operational amplifier OP. The voltage output circuit 531 is controlled by the selection signal SEL to generate the control voltage VINITN selectively using the first operating voltage interval (which is a voltage interval corresponding to the first supply voltage VPHV and the first ground voltage VGHV, such as the high negative voltage interval, in the embodiment) or the second operating voltage interval (which is a voltage interval corresponding to the second supply voltage VPMV and the second ground voltage VGMV, such as the medium negative voltage interval, in the embodiment). The first voltage interval is different from the second voltage interval. The voltage value of the control voltage VINITN is related to the reference voltage ELVSS of the OLED light emitting unit 310, and the selection signal SEL is correspondingly generated according to the reference voltage ELVSS.

Since the power consumption of the voltage regulating device 530 mainly comes from charging/discharging the parasitic capacitance Cp of the driving circuit 320 in the display device, the embodiment may be designed as the structure of the voltage regulating device 530 shown in FIG. 5 under the considerations of saving hardware resources and static power consumption. A first output stage circuit 532 or a second output stage circuit 533 in the voltage output circuit 531 may be dynamically switched according to voltage requirements of the control voltage VINITN to correspondingly provide the control voltage VINITN.

In detail, the voltage output circuit 531 in FIG. 5 includes the first output stage circuit 532, the second output stage circuit 533, and a selector 534. The first output stage circuit 532 operates in the first voltage interval corresponding to the first supply voltage VPHV and the first ground voltage VGHV, such as the high negative voltage interval. In other words, the first supply voltage VPHV and the first ground voltage VGHV are related to the first operating voltage interval. The first output stage circuit 532 includes a first upper arm transistor MP1 and a first lower arm transistor MN1. A first terminal (a drain terminal) of the first upper arm transistor MP1 is coupled to the first supply voltage VPMV. A second terminal (a source terminal) of the first upper arm transistor MP1 is coupled to an output terminal of the voltage output circuit 530. A control terminal (a gate terminal) of the first upper arm transistor MP1 is coupled to the selector 534. A first terminal (a source terminal) of the first lower arm transistor MN1 is coupled to an output terminal of the voltage output circuit 531. A second terminal (a drain terminal) of the first lower arm transistor MN1 is coupled to the first ground voltage VGMV. A control terminal (a gate terminal) of the first lower arm transistor MN1 is coupled to the selector 534.

The second output stage circuit 533 operates in the second voltage interval corresponding to the second supply voltage VPMV and the second ground voltage VGMV, such as the medium negative voltage interval. In other words, the second supply voltage VPMV and the second ground voltage VGMV are related to the second operating voltage interval. The second output stage circuit 533 includes a second upper arm transistor MP2 and a second lower arm transistor MN2. A first terminal (a drain terminal) of the second upper arm transistor MP2 is coupled to the second supply voltage VPMV. A second terminal (a source terminal) of the second upper arm transistor MP2 is coupled to the output terminal of the voltage output circuit 531. A control terminal (a gate terminal) of the second upper arm transistor MP2 is coupled to the selector 534. A first terminal (a source terminal) of the second lower arm transistor MN2 is coupled to the output terminal of the voltage output circuit 531. A second terminal (a drain terminal) of the second lower arm transistor MN2 is coupled to the second ground voltage VGMV. A control terminal (a gate terminal) of the second lower arm transistor MN2 is coupled to the selector 534.

The selector 534 selectively provides an output voltage generated by the operational amplifier OP to one of the first output stage circuit 532 and the second output stage circuit 533 according to the selection signal SEL. The selector 534 includes a first upper arm switch SWUA, a second upper arm switch SWUB, a first lower arm switch SWLA, and a second lower arm switch SWLB. The first upper arm switch SWUA is coupled between a first output terminal POUT1 of the operational amplifier OA and the control terminal of the first upper arm transistor MP1. The second upper arm switch SWUB is coupled between the first output terminal POUT1 of the operational amplifier OP and the control terminal of the second upper arm transistor MP2. The first lower arm switch SWLA is coupled between a second output terminal POUT2 of the operational amplifier OP and the control terminal of the first lower arm transistor MN1. The second lower arm switch SWLB is coupled between the second output terminal POUT2 of the operational amplifier OP and the control terminal of the second lower arm transistor MN2.

The first upper arm switch SWUA and the second upper arm switch SWUB selectively provide a first output signal on the first output terminal POUT1 to one of the control terminal of the first upper arm transistor MP1 and the control terminal of the second upper arm transistor MP2 according to the selection signal SEL. The first lower arm switch SWLA and the second lower arm switch SWLB selectively provide a second output signal on the second output terminal POUT2 to one of the control terminal of the first lower arm transistor MN1 and the control terminal of the second upper arm transistor MN2 according to the selection signal SEL. Specifically, when the voltage value of the control voltage VINITN is set to be in the high negative voltage interval, the first output stage circuit 532 is used to charge/discharge the OLED display unit 310 and the driving circuit 320. At this time, the selection signal SEL is used to select the first output stage circuit 532 to provide the control voltage VINITN to the output terminal of the voltage regulating device 530 through the first output stage circuit 532. Two terminals of the first upper arm switch SWUA and the first lower arm switch SWLA are conducted to respectively provide the output signals (the first output signal and the second output signal) corresponding to the two output terminals (the first output terminal POUT1 and the second output terminal POUT2) of the operational amplifier OP to the control terminal of the first upper arm transistor MP1 and the control terminal of the first lower arm transistor MN1. Two terminals of the second upper arm switch SWUB and the second lower arm switch SWLB are disconnected.

Correspondingly, when the voltage value of the control voltage VINITN is set to be in the medium negative voltage interval, the second output stage circuit 533 is used to charge/discharge the OLED display unit 310 and the driving circuit 320. At this time, the selection signal SEL is used to select the second output stage circuit 533 to provide the control voltage VINITN to the output terminal of the voltage regulating device 530 through the second output stage circuit 533, and the two terminals of the second upper arm switch SWUB and the second lower arm switch SWLB are conducted to respectively provide the output signals corresponding to the two output terminals of the operational amplifier OP to the control terminal of the second upper arm transistor MP2 and the control terminal of the second lower arm transistor MN2. The two terminals of the first upper arm switch SWUA and the first lower arm switch SWLA are disconnected.

In the embodiment, the operational amplifier OP, the switches SWUA, SWUB, SWLA, and SWLB in the selector 534, and the transistors MP1 and MN1 in the first output stage circuit 532 in FIG. 5 need to support the high negative voltage interval. Therefore, the above elements need to adopt process components that may withstand the high negative voltage interval. The transistors MP2 and MN2 in the second output stage circuit 533 may selectively adopt process components that may withstand the medium negative voltage interval or the high negative voltage interval.

Figure 6:
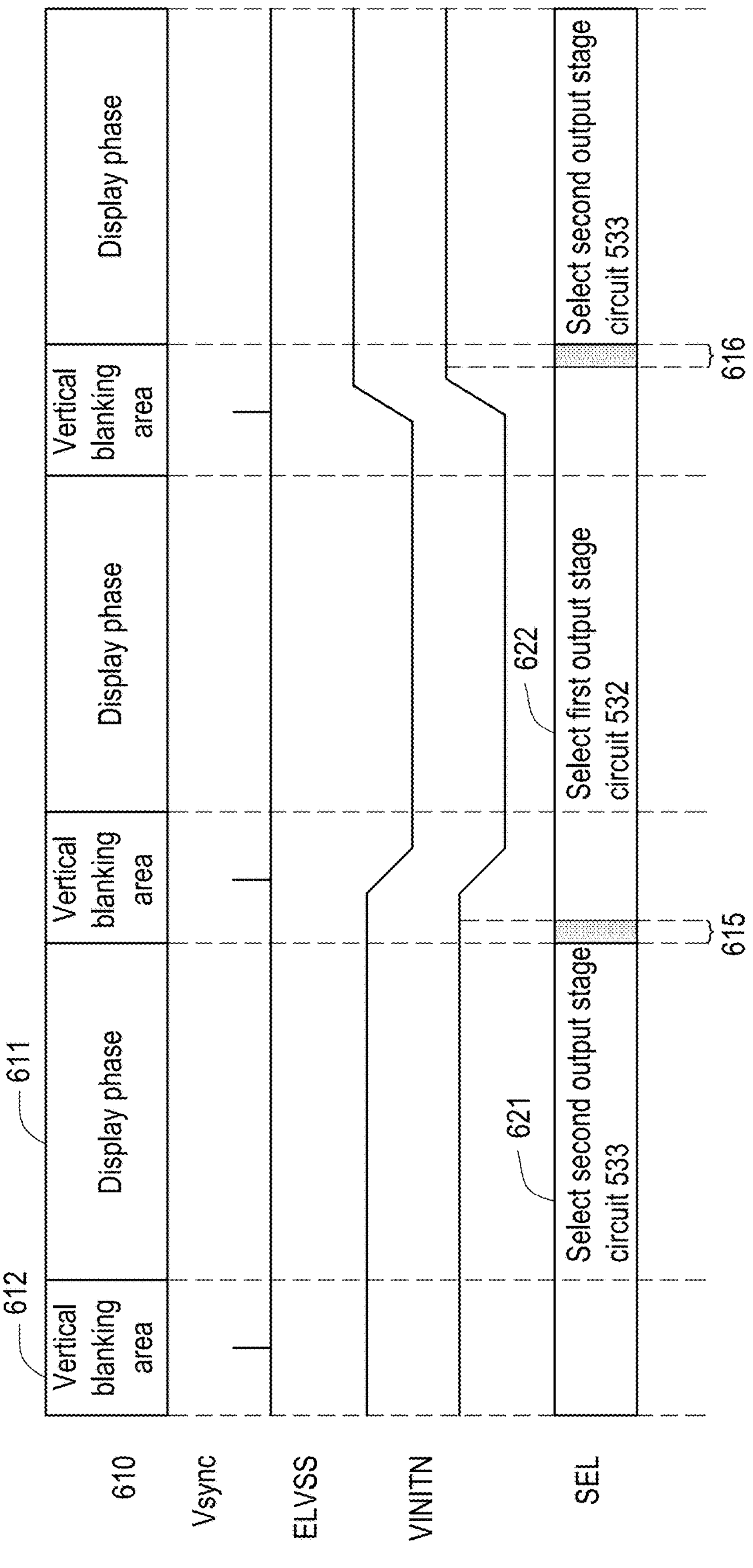
FIG. 6 is a schematic diagram of a waveform of each signal in the voltage regulating device according to the second embodiment of the disclosure.

FIG. 6 is a schematic diagram of a waveform of each signal in the voltage regulating device 330 according to the second embodiment of the disclosure. A reference numeral 610 in FIG. 6 represents the driving timing of the display device, which respectively involves a display phase (for example, a display phase 611) for displaying an image and a vertical blanking area (for example, a vertical blanking area 612) for switching the displayed image. Referring to FIG. 5 and FIG. 6 at the same time, the control voltage VINITN is provided selectively through the first output stage circuit 532 or the second output stage circuit 533 according to the required operating voltage interval. For example, during a period 621, the voltage regulating device 530 selects to provide the control voltage VINITN through the second output stage circuit 533 according to the selection signal SEL; and during a period 622, the voltage regulating device 330 selects to provide the control voltage VINITN through the first output stage circuit 532 according to the selection signal SEL.

In order to extenuate surges that may be generated during a period of switching the first output stage circuit 532 and the second output stage circuit 533, periods for switching (for example, switching periods 615 and 616) may be set in the vertical blanking area. Persons applying the embodiment may also switch the first output stage circuit 532 and the second output stage circuit 533 in a non-vertical blanking area according to requirements.

Moreover, in order to extenuate the surges, the first output stage circuit 532 and the second output stage circuit 533 may be simultaneously enabled during the entire period, and during switching (for example, the switching periods 615 and 616), the voltage values of the control voltages VINITN generated by the first output stage circuit 532 and the second output stage circuit 533 need to be the same. In another embodiment compliant with the disclosure, the first output stage circuit 532 and the second output stage circuit 533 may also be non-overlappingly switched during the switching periods 615 and 616 to prevent short-circuit current from being generated inside the circuit. In other words, in an embodiment, the first output stage circuit 532 and the second output stage circuit 533 may both be turned off during the switching periods 615 and 616, the first output stage circuit 532 is enabled after the period 615, and the second output stage circuit 533 is enabled after the period 616. In the above situation, the voltage value of the control voltage VINITN is maintained by relying on the parasitic capacitance (for example, the parasitic capacitance Cp of FIG. 5) in the display device.

When switching the first output stage circuit 532 and the second output stage circuit 533 to provide the corresponding voltage, it should be noted that the operating voltage intervals provided by the output stage circuits 532 and 533 are not the same, and the first operating voltage interval (the high negative voltage interval) corresponding to the first output stage circuit 532 may include the second operating voltage interval (the medium negative voltage interval) corresponding to the second output stage circuit 533. Therefore, the first output stage circuit 532 needs to be used to boost or lower the control voltage VINITN in the first operating voltage interval (the high negative voltage interval) exceeding the second operating voltage interval (the medium negative voltage interval). When the control voltage VINITN is boosted or lowered to be in the second operating voltage interval (the medium negative voltage interval), the first output stage circuit 532 is then switched to the second output stage circuit 533.

For example, when the control voltage VINITN is to be switched from the medium negative voltage interval to the high negative voltage interval, the selector 532 is used to switch from the second output stage circuit 533 to the first output stage circuit 532. At this time, the control voltage VINITN is in the second voltage interval (the medium negative voltage interval). Then, the first output stage circuit

532 is used to reduce the voltage level of the control voltage VINITN to the first voltage interval (the high negative voltage interval), thereby completing the switching from the second output stage circuit 533 to the first output stage circuit 532. Correspondingly, when the control voltage VINITN is to be switched from the high negative voltage interval to the medium negative voltage interval, since the second output stage circuit 533 cannot provide the voltage level in the high negative voltage interval, the voltage level of the control voltage VINITN provided by the first output stage circuit 532 needs to be first reduced to the second voltage interval (the medium negative voltage interval). Then, the selector 333 is used to switch from the first output stage circuit 532 to the second output stage circuit 533, thereby completing the switching from the first output stage circuit 532 to the second output stage circuit 533.

Figure 7:
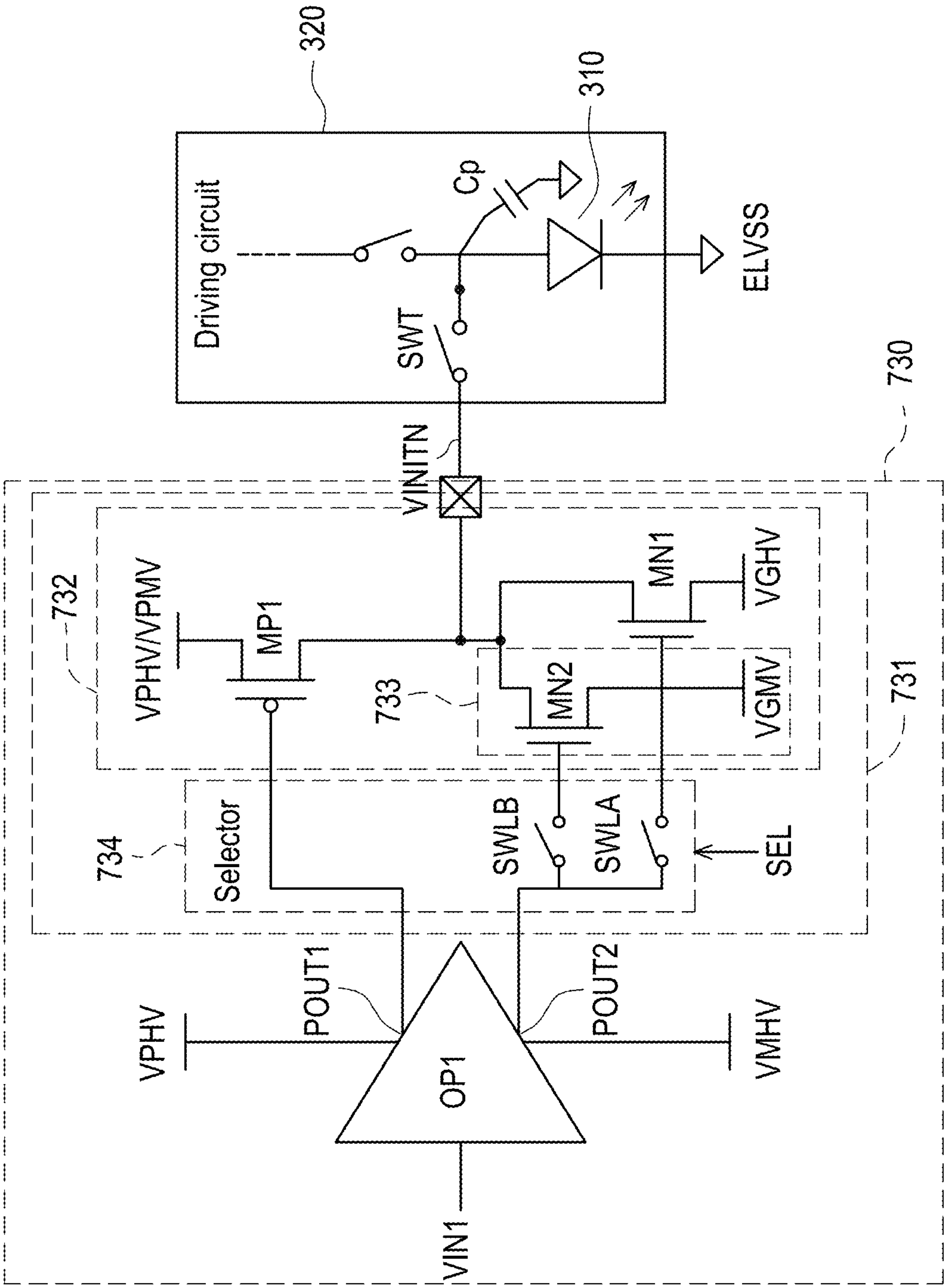
FIG. 7 is a schematic diagram of an OLED display unit, a driving circuit, and a voltage regulating device according to a third embodiment of the disclosure.

In other embodiments compliant with the disclosure, the voltage regulating device mainly discharges a positive terminal voltage point of the OLED display unit 310, because a positive terminal voltage value of the OLED display unit 310 is usually intended to be reduced. Therefore, under further consideration of saving hardware resources, only a discharge path of the output stage circuit (for example, a path corresponding to the lower arm transistor) in the voltage regulating device may be switched to provide the control voltages VINITN in different operating voltage intervals, as shown in FIG. 7. FIG. 7 is a schematic diagram of the OLED display unit 310, the driving circuit 320, and a voltage regulating device 730 according to a third embodiment of the disclosure. The OLED display unit 310 and the driving circuit 320 in FIG. 7 are described as the corresponding elements in FIG. 3.

The voltage regulating device 730 includes the operational amplifier OP and a voltage output circuit 731. The operational amplifier OP generates the output voltage according to the input voltage VIN1. The voltage output circuit 731 is coupled to the operational amplifier OP. The voltage output circuit 731 is controlled by the selection signal SEL to generate the control voltage VINITN selectively using the first operating voltage interval (the voltage interval corresponding to the first supply voltage VPHV and the first ground voltage VGHV, such as the high negative voltage interval) or the second operating voltage interval (the voltage interval corresponding to the second supply voltage VPMV and the second ground voltage VGMV, such as the medium negative voltage interval, in the embodiment). The first supply voltage VPHV and the second supply voltage VPMV of the embodiment have the same voltage value, such as 0 V.

In detail, the voltage output circuit 731 in FIG. 7 includes a first output stage circuit 732, a second output stage circuit 733, and a selector 734. The first output stage circuit 732 operates in the first voltage interval corresponding to the first supply voltage VPHV and the first ground voltage VGHV, such as the high negative voltage interval. The circuit structure of the first output stage circuit 732 is similar to the first output stage circuit 532 in FIG. 5.

The main differences between FIG. 7 and FIG. 5 are that the second output stage circuit 733 only includes the second lower arm transistor MN2 and the selector 734 only includes the first lower arm switch SWLA and the second lower arm switch SWLB. Specifically, the first terminal (the source terminal) of the second lower arm transistor MN2 is coupled to an output terminal of the voltage output circuit 731. The second terminal (the drain terminal) of the second lower arm transistor MN2 is coupled to the second ground voltage VGMV. The control terminal (the gate terminal) of the second lower arm transistor MN2 is coupled to the selector 734. The selector 734 selectively provides the second output voltage generated by the second terminal of the operational amplifier OP to one of the control terminal of the first lower arm transistor MN1 of the first output stage circuit 732 and the control terminal of the second lower arm transistor MN2 of the second output stage circuit 733 according to the selection signal SEL. In other words, the embodiment dynamically switches the operating voltage interval in the voltage regulating device 730 through switching lower arm discharge paths of the output stage circuits 731 and 732, thereby providing the corresponding control voltage VINITN.

In the embodiment, the operational amplifier OP, the switches SWLA and SWLB in the selector 733, and the transistors MP1 and MN1 in the first output stage circuit 732 in FIG. 7 need to support the high negative voltage interval. Therefore, the above elements need to adopt process components that may withstand the high negative voltage interval. The transistors MP2 and MN2 in the second output stage circuit 733 may selectively adopt process components that may withstand the medium negative voltage interval or the high negative voltage interval.

Figure 8:
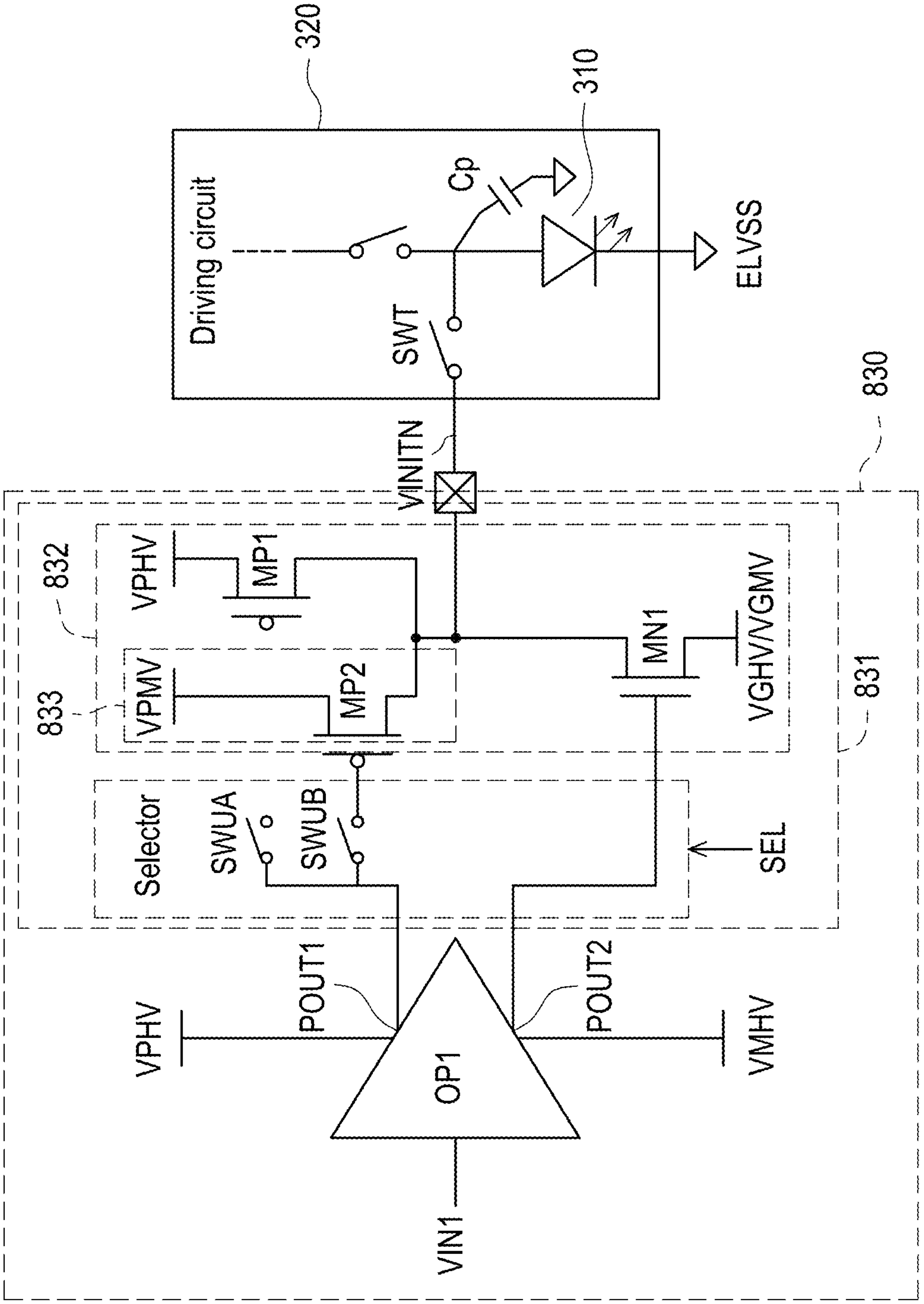
FIG. 8 is a schematic diagram of an OLED display unit, a driving circuit, and a voltage regulating device according to a fourth embodiment of the disclosure.

In other embodiments compliant with the disclosure, it is also possible to design the voltage regulating device to mainly charge the positive terminal voltage point of the OLED display unit 310. Therefore, under further consideration of saving hardware resources, only a charging path of the output stage circuit (for example, a path corresponding to the upper arm transistor) in the voltage regulating device may be switched to provide the control voltages VINITN in different operating voltage intervals, as shown in FIG. 8. FIG. 8 is a schematic diagram of the OLED display unit 310, the driving circuit 320, and a voltage regulating device 830 according to a fourth embodiment of the disclosure. The OLED display unit 310 and the driving circuit 320 in FIG. 8 are described as the corresponding elements in FIG. 3.

The voltage regulating device 830 includes the operational amplifier OP and a voltage output circuit 831. The voltage output circuit 831 is coupled to the operational amplifier OP. The voltage output circuit 831 is controlled by the selection signal SEL to generate the control voltage VINITN selectively using the first operating voltage interval (the voltage interval corresponding to the first supply voltage VPHV and the first ground voltage VGHV, such as the high negative voltage interval) or the second operating voltage interval (the voltage interval corresponding to the second supply voltage VPMV and the second ground voltage VGMV, such as the medium negative voltage interval, in the embodiment). The first ground voltage VGHV and the second ground voltage VGMV of the embodiment have the same voltage value.

In detail, the voltage output circuit 831 in FIG. 8 includes a first output stage circuit 832, a second output stage circuit 833, and a selector 834. The first output stage circuit 832 operates in the first voltage interval corresponding to the first supply voltage VPHV and the first ground voltage VGHV, such as the high negative voltage interval. The circuit structure of the first output stage circuit 832 is similar to the first output stage circuit 532 in FIG. 5.

The main differences between FIG. 8 and FIG. 5 are that the second output stage circuit 833 only includes the second upper arm transistor MP2 and the selector 834 only includes the first upper arm switch SWUA and the second upper arm switch SWUB. Specifically, the first terminal (the drain terminal) of the second upper arm transistor MP2 is coupled to the second supply voltage VPMV. The second terminal (the source terminal) of the second upper arm transistor MP2 is coupled to an output terminal of the voltage output circuit 831. The control terminal (the gate terminal) of the second lower arm transistor MN2 is coupled to the selector 834.

The selector 834 selectively provides the first output voltage generated by the first terminal of the operational amplifier OP to one of the control terminal of the first lower arm transistor MN1 of the first output stage circuit 832 and the control terminal of the second lower arm transistor MN2 of the second output stage circuit 833 according to the selection signal SEL. In other words, the embodiment dynamically switches the operating voltage interval in the voltage regulating device 830 through switching upper arm discharge paths of the output stage circuits 831 and 832, thereby providing the corresponding control voltage VINITN.

In the embodiment, the operational amplifier OP, the switches SWUA and SWUB in the selector 833, and the transistors MP1 and MN1 in the first output stage circuit 832 in FIG. 8 need to support the high negative voltage interval. Therefore, the above elements need to adopt process components that may withstand the high negative voltage interval. The transistors MP2 and MN2 in the second output stage circuit 833 may selectively adopt process components that may withstand the medium negative voltage interval or the high negative voltage interval.

Figure 9:
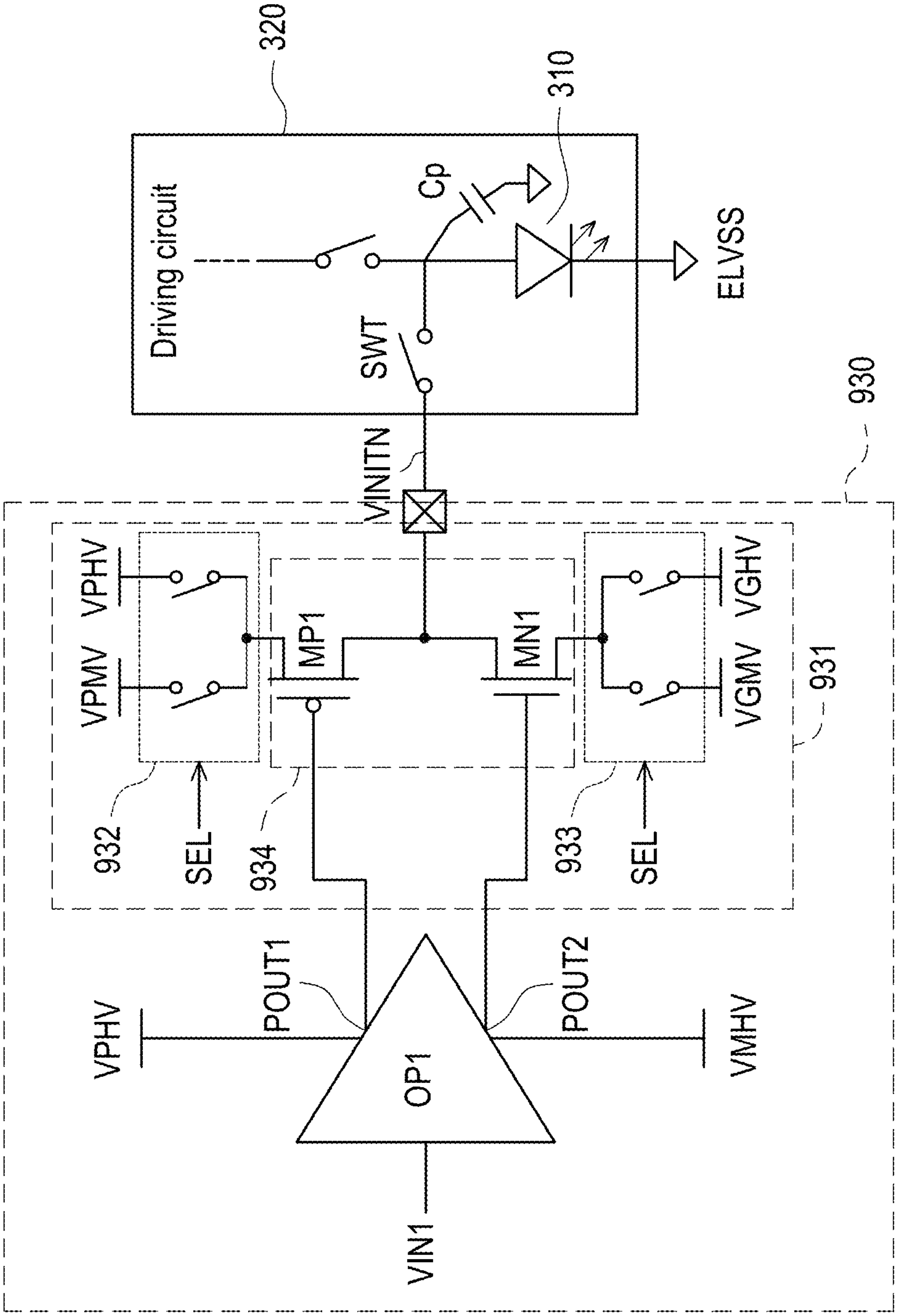
FIG. 9 is a schematic diagram of an OLED display unit, a driving circuit, and a voltage regulating device according to a fifth embodiment of the disclosure.

In other embodiments compliant with the disclosure, it is also possible to design to switch the voltage interval of the output stage circuit in the voltage regulating device to the first voltage interval or the second voltage interval, thereby dynamically switching the operating voltage interval in the voltage regulating device, thereby providing the corresponding control voltage VINITN, as shown in FIG. 9. FIG. 9 is a schematic diagram of the OLED display unit 310, the driving circuit 320, and a voltage regulating device 930 according to a fifth embodiment of the disclosure. The OLED display unit 310 and the driving circuit 320 in FIG. 9 are described as the corresponding elements in FIG. 3.

The voltage regulating device 930 includes the operational amplifier OP and a voltage output circuit 931. The voltage output circuit 931 is coupled to the operational amplifier OP. The voltage output circuit 931 is controlled by the selection signal SEL to generate the control voltage VINITN selectively using the first operating voltage interval (the voltage interval corresponding to the first supply voltage VPHV and the first ground voltage VGHV, such as the high negative voltage interval) or the second operating voltage interval (the voltage interval corresponding to the second supply voltage VPMV and the second ground voltage VGMV, such as the medium negative voltage interval, in the embodiment).

In detail, the voltage output circuit 931 in FIG. 8 includes the upper arm transistor MP1, the lower arm transistor MN1, a first selector 932, and a second selector 933. The second terminal of the upper arm transistor MP1 is coupled to an output terminal of the voltage output circuit 930. The output terminal is used to provide the control voltage VINITN to the driving circuit 320. The first selector 932 selectively couples one of the first supply voltage VPMV and the second supply voltage VPHV to the first terminal of the upper arm transistor MP1 according to the selection signal SEL. The first terminal of the lower arm transistor MN1 is coupled to the output terminal of the voltage output circuit 930. The second selector 933 selectively couples one of the first ground voltage VGHV and the second ground voltage VGMV to the second terminal of the lower arm transistor MN1 according to the selection signal SEL. The first supply voltage VPHV and the first ground voltage VGHV are related to the first operating voltage interval. The second supply voltage VPMV and the second ground voltage VGMV are related to the second operating voltage interval.

When the voltage regulating device 930 is to provide the control voltage VINITN to the driving circuit 320 in the first operating voltage interval, the first selector 932 couples the first supply voltage VPMV to the first terminal of the upper arm transistor MP1, and the second selector 933 couples the first ground voltage VGHV to the second terminal of the lower arm transistor MN1. In this way, an output stage circuit 934 composed of the upper arm transistor MP1 and the lower arm transistor MN1 may provide the control voltage VINITN through the first operating voltage interval. Correspondingly, when the voltage regulating device 930 is to provide the control voltage VINITN to the driving circuit 320 in the second operating voltage interval, the first selector 932 couples the second supply voltage VPMV to the first terminal of the upper arm transistor MP1, and the second selector 933 couples the second ground voltage VGMV to the second terminal of the lower arm transistor MN1. In this way, an output stage circuit 934 composed of the upper arm transistor MP1 and the lower arm transistor MN1 may provide the control voltage VINITN through the second operating voltage interval. The first selector 932 and the second selector 933 of FIG. 9 may need to have a reduced conduction resistance to prevent the circuit structure from consuming each voltage level. Therefore, larger-sized process components may be used to implement the first selector 932 and the second selector 933.

In the embodiment, the operational amplifier OP, the first selector 932, the second selector 933, and each element in the output stage circuit 934 in FIG. 9 all need to support the high negative voltage interval. Therefore, the above elements need to adopt process components that may withstand the high negative voltage interval.

Figure 10:
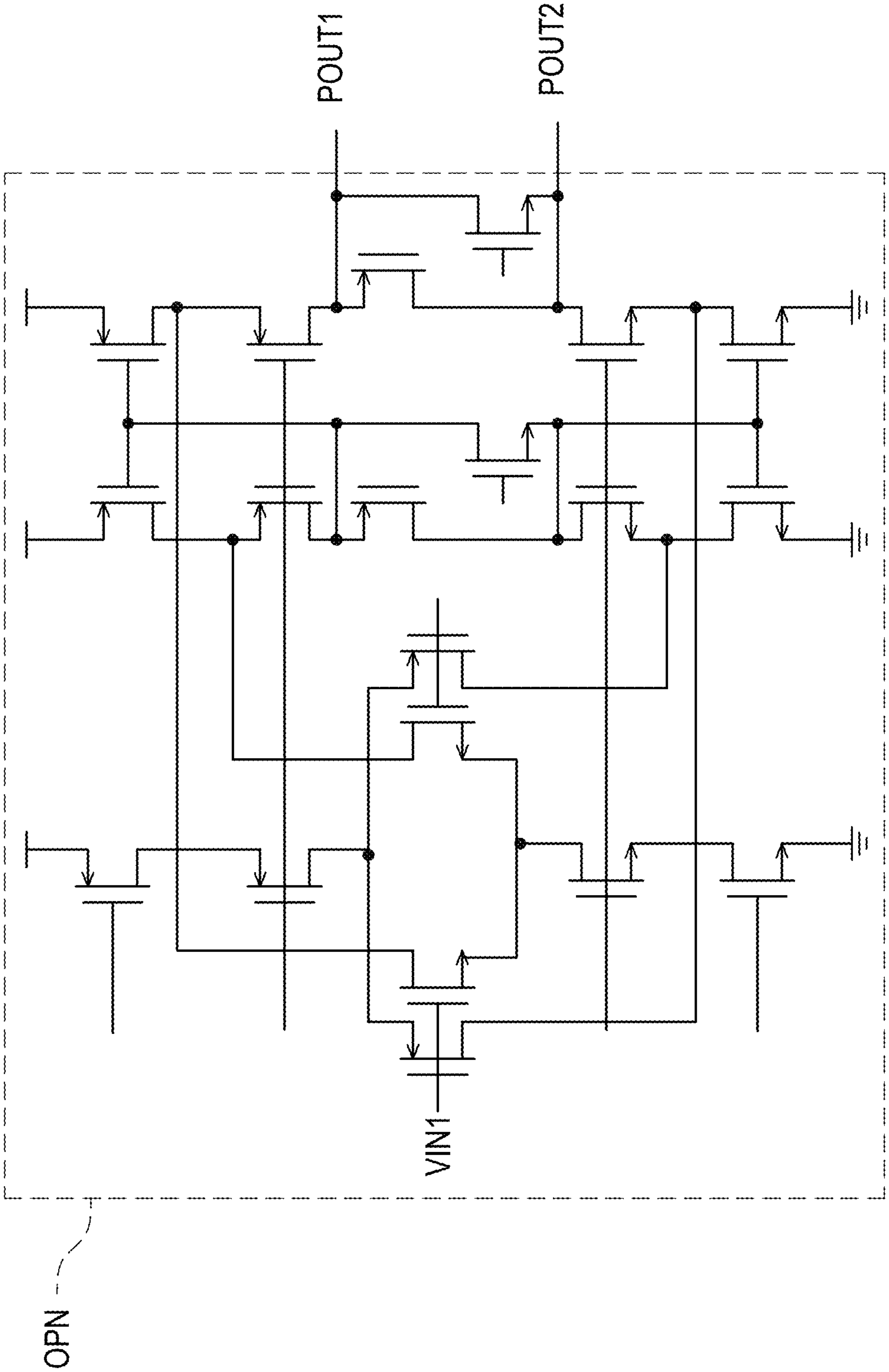
FIG. 10 is a circuit diagram that may be used for an operational amplifier according to each embodiment of the disclosure.

FIG. 10 is a circuit diagram that may be used for an operational amplifier OPN according to each embodiment of the disclosure. The operational amplifier OPN in FIG. 10 has a circuit structure that may be applied to each embodiment of the disclosure and the operational amplifiers OP, OP1, and OP2 in FIGS. 3, 5, and 7 to 9, as a reference for persons applying the embodiment. Persons applying the embodiment may also use operational amplifiers with other circuit structures to implement the operational amplifiers OP, OP1, and OP2 in FIGS. 3, 5, and 7 to 9. FIG. 10 is only one example. The operational amplifier OPN in FIG. 10 may receive the input voltage VIN1, and respectively provide the corresponding output voltages at the first output terminal POUT1 and the second output terminal POUT2.

In summary, the voltage regulating device for the organic light emitting diode according to the embodiments of the disclosure dynamically switches the operating voltage interval in the voltage regulating device through the design of the circuit structure, so that the voltage regulating device may correspondingly generate the control voltage for preventing the organic light emitting diode from emitting light selectively based on the reference voltage of the organic light emitting diode, which can reduce the power consumption of the voltage regulating device, and can still provide the corresponding operating voltage normally when the reference voltage of the organic light emitting diode is in a higher negative voltage operating interval.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A voltage regulating device for an organic light emitting diode, comprising:

an operational amplifier, generating an output voltage; and a voltage output circuit, coupled to the operational amplifier, wherein the voltage output circuit is controlled by a selection signal to generate a control voltage selectively using a first operating voltage interval or a second operating voltage interval, and the first operating voltage interval is different from the second operating voltage interval, wherein a voltage value of the control voltage is related to a reference voltage of the organic light emitting diode, and the selection signal is correspondingly generated according to the reference voltage of the organic light emitting diode.

2. The voltage regulating device according to claim 1, wherein the voltage output circuit comprises:

a first output stage circuit, operating in the first operating voltage interval;

a second output stage circuit, operating in the second operating voltage interval; and a selector, selectively providing the output voltage to one of the first output stage circuit and the second output stage circuit according to the selection signal.

3. The voltage regulating device according to claim 2, wherein the first output stage circuit comprises:

a first upper arm transistor, wherein a first terminal of the first upper arm transistor is coupled to a first supply voltage, a second terminal of the first upper arm transistor is coupled to an output terminal of the voltage output circuit, and a control terminal of the first upper arm transistor is coupled to the selector; and a first lower arm transistor, wherein a first terminal of the first lower arm transistor is coupled to the output terminal of the voltage output circuit, a second terminal of the first lower arm transistor is coupled to a first ground voltage, and a control terminal of the first lower arm transistor is coupled to the selector, wherein the first supply voltage and the first ground voltage are related to the first operating voltage interval.

4. The voltage regulating device according to claim 3, wherein the second output stage circuit comprises:

a second upper arm transistor, wherein a first terminal of the second upper arm transistor is coupled to a second supply voltage, a second terminal of the second upper arm transistor is coupled to the output terminal of the voltage output circuit, and a control terminal of the second upper arm transistor is coupled to the selector; and a second lower arm transistor, wherein a first terminal of the second lower arm transistor is coupled to the output terminal of the voltage output circuit, a second terminal of the second lower arm transistor is coupled to a second ground voltage, and a control terminal of the second lower arm transistor is coupled to the selector, wherein the second supply voltage and the second ground voltage are related to the second operating voltage interval.

5. The voltage regulating device according to claim 4, wherein the selector comprises:

a first upper arm switch, coupled between a first output terminal of the operational amplifier and the control terminal of the first upper arm transistor;

a second upper arm switch, coupled between the first output terminal of the operational amplifier and the control terminal of the second upper arm transistor, wherein the first upper arm switch and the second upper arm switch selectively provide a first output signal on the first output terminal to one of the control terminal of the first upper arm transistor and the control terminal of the second upper arm transistor according to the selection signal;

a first lower arm switch, coupled between a second output terminal of the operational amplifier and the control terminal of the first lower arm transistor; and a second lower arm switch, coupled between the second output terminal of the operational amplifier and the control terminal of the second lower arm transistor, wherein the first lower arm switch and the second lower arm switch selectively provide a second output signal on the second output terminal to one of the control terminal of the first lower arm transistor and the control terminal of the second lower arm transistor according to the selection signal.

6. The voltage regulating device according to claim 1, wherein the voltage regulating device is coupled to a driving circuit of the organic light emitting diode, wherein the driving circuit prevents the organic light emitting diode from emitting light using the control voltage.

7. The voltage regulating device according to claim 1, wherein a switching time point of the selection signal is in a vertical blanking area of a driving timing of a display panel.

8. The voltage regulating device according to claim 3, wherein the second output stage circuit comprises:

a second lower arm transistor, wherein a first terminal of the second lower arm transistor is coupled to the output terminal of the voltage output circuit, a second terminal of the second lower arm transistor is coupled to a second ground voltage, and a control terminal of the second lower arm transistor is coupled to the selector, wherein a second supply voltage and the second ground voltage are related to the second operating voltage interval.

9. The voltage regulating device according to claim 8, wherein the selector comprises:

a first lower arm switch, coupled between a second output terminal of the operational amplifier and the control terminal of the first lower arm transistor; and a second lower arm switch, coupled between the second output terminal of the operational amplifier and the control terminal of the second lower arm transistor, wherein the first lower arm switch and the second lower arm switch selectively provide a second output signal on the second output terminal to one of the control terminal of the first lower arm transistor and the control terminal of the second lower arm transistor according to the selection signal.

10. The voltage regulating device according to claim 3, wherein the second output stage circuit comprises:

a second upper arm transistor, wherein a first terminal of the second upper arm transistor is coupled to the output terminal of the voltage output circuit, a second terminal of the second upper arm transistor is coupled to a second supply voltage, and a control terminal of the second upper arm transistor is coupled to the selector, wherein the second supply voltage and a first ground voltage are related to the second operating voltage interval.

11. The voltage regulating device according to claim 10, wherein the selector comprises:

a first upper arm switch, coupled between a first output terminal of the operational amplifier and the control terminal of the first upper arm transistor; and a second upper arm switch, coupled between the first output terminal of the operational amplifier and the control terminal of the second upper arm transistor, wherein the first upper arm switch and the second upper arm switch selectively provide a first output signal on the first output terminal to one of the control terminal of the first upper arm transistor and the control terminal of the second upper arm transistor according to the selection signal.

12. The voltage regulating device according to claim 1, wherein the voltage output circuit comprises:

an upper arm transistor, wherein a second terminal of the upper arm transistor is coupled to an output terminal of the voltage output circuit;

a first selector, selectively coupling one of a first supply voltage and a second supply voltage to a first terminal of the upper arm transistor according to the selection signal;

a lower arm transistor, wherein a first terminal of the lower arm transistor is coupled to the output terminal of the voltage output circuit; and a second selector, selectively coupling one of a first ground voltage and a second ground voltage to a second terminal of the lower arm transistor according to the selection signal, wherein the first supply voltage and the first ground voltage are related to the first operating voltage interval, and the second supply voltage and the second ground voltage are related to the second operating voltage interval.

* * * * *